United States Patent
Bloxberg et al.

(10) Patent No.: US 10,430,850 B2
(45) Date of Patent: Oct. 1, 2019

(54) SYSTEMS AND METHODS FOR PREVIEWING CUSTOMIZABLE PRODUCTS

(71) Applicant: Avanquest North America Inc., Calabasas, CA (US)

(72) Inventors: Roger Bloxberg, Woodland Hills, CA (US); Erik Malkemus, Los Angeles, CA (US); Gary Gonzalez, Santa Monica, CA (US)

(73) Assignee: PLANETART, LLC, Calabasas, CA (US)

( * ) Notice: Subject to any disclaimer, the term of this patent is extended or adjusted under 35 U.S.C. 154(b) by 490 days.

(21) Appl. No.: 15/206,074

(22) Filed: Jul. 8, 2016

(65) Prior Publication Data
US 2018/0012275 A1 Jan. 11, 2018

(51) Int. Cl.
*G06Q 30/00* (2012.01)
*G06Q 30/06* (2012.01)
*G06F 3/0481* (2013.01)
*G06F 3/0484* (2013.01)
*H04L 29/08* (2006.01)

(52) U.S. Cl.
CPC ....... *G06Q 30/0621* (2013.01); *G06F 3/0484* (2013.01); *G06F 3/04817* (2013.01); *H04L 67/02* (2013.01)

(58) Field of Classification Search
CPC ............. G06Q 30/06; G06Q 30/0621; G06F 3/04817; G06F 3/0484; H04L 67/02
See application file for complete search history.

(56) References Cited

U.S. PATENT DOCUMENTS 1,608,450 A 11/1926 Wetzell
5,317,679 A * 5/1994 Ueda ................. G09G 5/20
                                              345/428
(Continued)

OTHER PUBLICATIONS

Rodney Brazil "What is a Monogram?" Jul. 2, 2015 pp. 1-12. Retrieved from https://www.homewetbar.com/blog/what-is-monogram/ (Year: 2015).*

(Continued)

*Primary Examiner* — Naeem U Haq
(74) *Attorney, Agent, or Firm* — Bryan Cave Leighton Paisner LLP

(57) ABSTRACT

Some embodiments can include a system. In some embodiments, the system can comprise one or more processing modules and one or more non-transitory storage modules storing computing instructions configured to run on the one or more processing modules and perform acts. In some embodiments, the acts can comprise receiving input from a user, the input can comprise one or more user characters. In various embodiments, each of the one or more user characters can be associated with a different character file of one or more character files. In some embodiments, the acts can comprise generating a plurality of thumbnails of the one or more user characters on a plurality of customized products by, for each thumbnail of the plurality of thumbnails, composing a monogram file comprising the one or more user characters and combining a monogram container file of one or more monogram container files with the monogram file. Other embodiments of related methods and systems are also provided.

24 Claims, 11 Drawing Sheets

(56) References Cited

U.S. PATENT DOCUMENTS

| | | | |
|---|---|---|---|
| 6,344,853 B1* | 2/2002 | Knight | G06Q 10/087 345/629 |
| 7,454,711 B2 | 11/2008 | Angiulo et al. | |
| 8,041,607 B1 | 10/2011 | Coursol | |
| 8,086,466 B2 | 12/2011 | Stinson et al. | |
| 8,775,271 B2 | 7/2014 | Mills | |
| 8,952,981 B2* | 2/2015 | Saini | G09G 5/024 345/613 |
| 9,103,059 B2 | 8/2015 | Goldman et al. | |
| 2007/0044018 A1 | 2/2007 | Hanechak | |
| 2009/0105860 A1* | 4/2009 | Wiesel | G06Q 30/02 700/97 |
| 2009/0248546 A1* | 10/2009 | Norris | G06Q 30/02 705/26.1 |
| 2010/0036753 A1 | 2/2010 | Harvill et al. | |
| 2012/0116914 A1 | 5/2012 | Stinson et al. | |
| 2012/0173335 A1 | 7/2012 | Amzallag et al. | |

OTHER PUBLICATIONS

No Author "Teamcenter 10.1 Getting Started with Product Visualization" Publication No. PLM00109. © 2013 Siemens Product Lifecycle Management Software Inc. (Year: 2013).*

* cited by examiner

400

405 - Receiving input from a user, the input comprising one or more user characters, each of the one or more user characters associated with a different character file of one or more character files.

410 - Generating a plurality of thumbnails of the one or more user characters on a plurality of customized products by: for each thumbnail of the plurality of thumbnails: composing a monogram file comprising the one or more user characters; and combining a monogram container file of one or more monogram container files with the monogram file.

415 - Facilitating a display of the plurality of thumbnails to the user.

505 - Modifying one or more character files by: for each character file of the one or more character files and for each monogram container file of one or more monogram container files: adjusting a spacing of a character within the each character file of the one or more character files.

↓

510 - Receiving input from a user, the input comprising one or more user characters, each of the one or more user characters associated with a different character file of the one or more character files.

↓

515 - Generating a thumbnail by: composing a monogram file comprising the one or more user characters by rendering at least one of the one or more character files; and combining a monogram container file of the one or more monogram container files with the monogram file.

↓

520 - Facilitating a display of the thumbnail to the user.

SYSTEMS AND METHODS FOR PREVIEWING CUSTOMIZABLE PRODUCTS

TECHNICAL FIELD

This disclosure relates generally to systems and methods for previewing customizable products, and relates more particularly to systems to prepare monogram designs on different products and generate thumbnails, and related methods.

BACKGROUND

Currently, websites providing customizable products are not able to efficiently display previews of a plurality of user-designed custom products. Typically, a website provides previews of customizable products with default designs that can later be customized one at a time by the user after the user selects a product or after the user adds the product to the user's shopping cart and begins the online checkout process.

BRIEF DESCRIPTION OF THE DRAWINGS

To facilitate further description of the embodiments, the following drawings are provided in which:

FIG. 4 is a flowchart for a method, according to an embodiment;

FIG. 5 illustrates a flowchart for a method, according to another embodiment;

Figure 1:
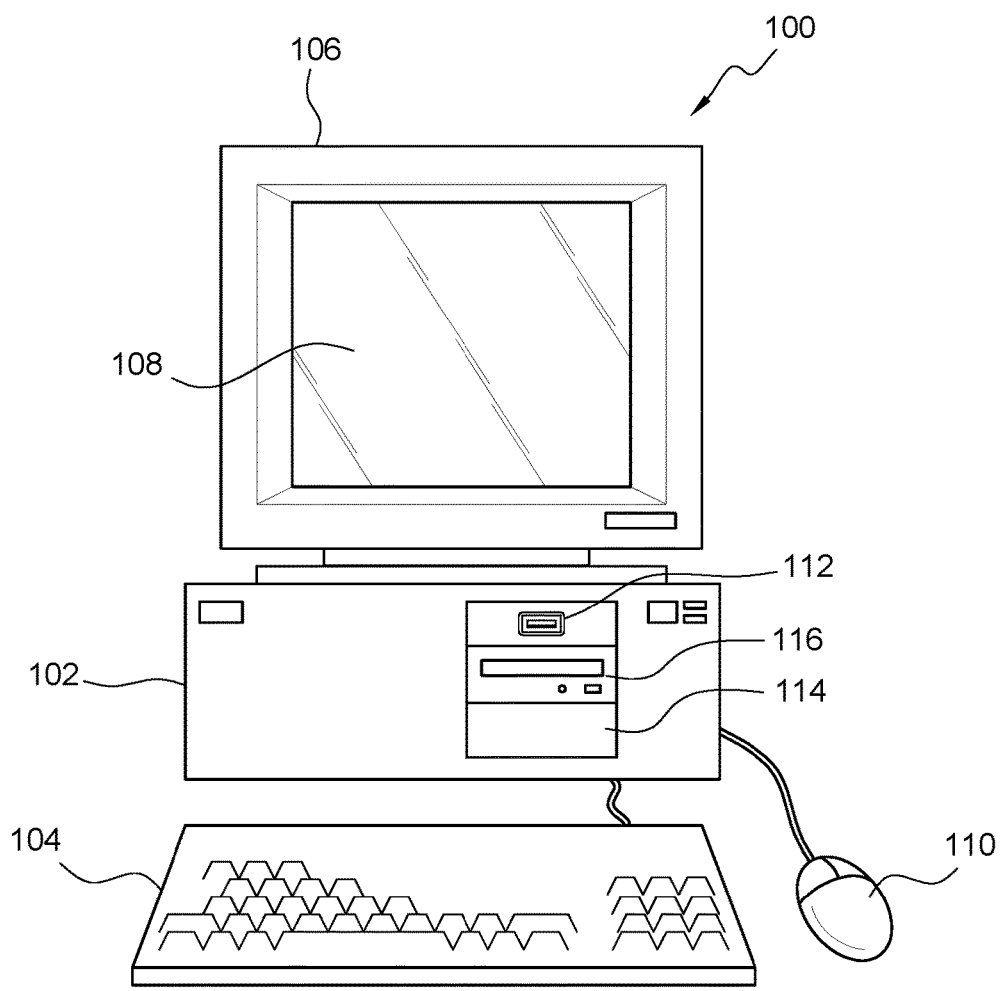
FIG. 1 illustrates a front elevation view of a computer system that is suitable for implementing at least part of a central computer system.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Some embodiments can include a system. In some embodiments, the system can comprise one or more processing modules and one or more non-transitory storage modules storing computing instructions configured to run on the one or more processing modules and perform acts. In some embodiments, the acts can comprise receiving input from a user, and the input can comprise one or more user characters. In various embodiments, each of the one or more user characters can be associated with a different character file of one or more character files. In some embodiments, the acts can further comprise generating a plurality of thumbnails of the one or more user characters on a plurality of customized products by, for each thumbnail of the plurality of thumbnails, composing a monogram file comprising the one or more user characters and combining a monogram container file of one or more monogram container files with the monogram file. In many embodiments, the acts can further comprise facilitating a display of the plurality of thumbnails to the user.

Some embodiments can include a method. In many embodiments, the method can comprise receiving input from a user. In some embodiments, the input can comprise one or more user characters, and each of the one or more user characters can be associated with a different character file of one or more character files. In various embodiments, the method can further comprise generating a plurality of thumbnails of the one or more user characters on a plurality of customized products by, for each thumbnail of the plurality of thumbnails, composing a monogram file comprising the one or more user characters, and combining a monogram container file of one or more monogram container files with the monogram file. In many embodiments, the method can further comprise facilitating a display of the plurality of thumbnails to the user.

Some embodiments can comprise a system. In many embodiments, the system can comprise one or more processing modules and one or more non-transitory storage modules storing computing instructions configured to run on the one or more processing modules and perform the acts. In various embodiments, the acts can comprise modifying one or more character files by, for each character file of the one or more character files and for each monogram container file of one or more monogram container files, adjusting a spacing of a character within each character file of the one or more character files. In some embodiments, the acts can further comprise receiving input from a user, the input comprising one or more user characters, and each of the one or more user characters can be associated with a different character file of the one or more character files. In many embodiments, the acts can further comprise generating a thumbnail by composing a monogram file comprising the one or more user characters by rendering at least one of the one or more character files, and combining a monogram container file of the one or more monogram container files with the monogram file. In many embodiments, the acts can comprise facilitating a display of the thumbnail to the user.

Various embodiments can comprise a method. In some embodiments, the method can comprise modifying one or more character files by, for each character file of the one or more character files and for each monogram container file of one or more monogram container files, adjusting a spacing of a character within each character file of the one or more character files. In some embodiments, the method can further comprise receiving input from a user, the input can comprise one or more user characters, and each of the one or more user characters can be associated with a different character file of the one or more character files. In a number of embodiments, the method can further comprise generating a thumbnail by composing a monogram file comprising the one or more user characters by rendering at least one of the one or more character files and combining a monogram container file of the one or more monogram container files with the monogram file. In many embodiments, the method can comprise facilitating a display of the thumbnail to the user.

Figure 2:
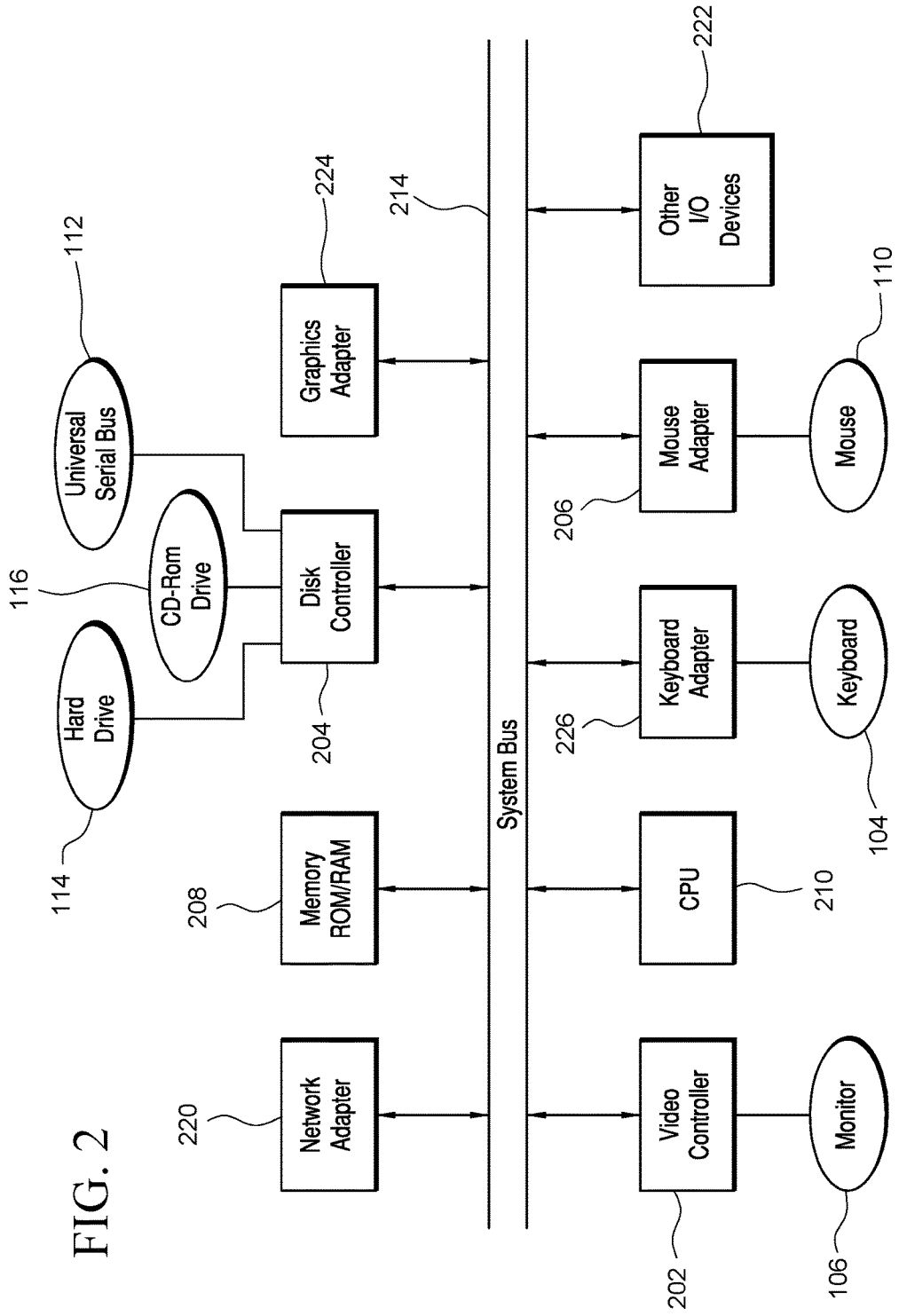
FIG. 2 illustrates a representative block diagram of exemplary elements included on the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) volatile (e.g., transitory) memory, such as, for example, read only memory (ROM) and/or (ii) non-volatile (e.g., non-transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), a CD-ROM and/or DVD for use with CD-ROM and/or DVD drive 116 (FIGS. 1-2), a floppy disk for use with a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
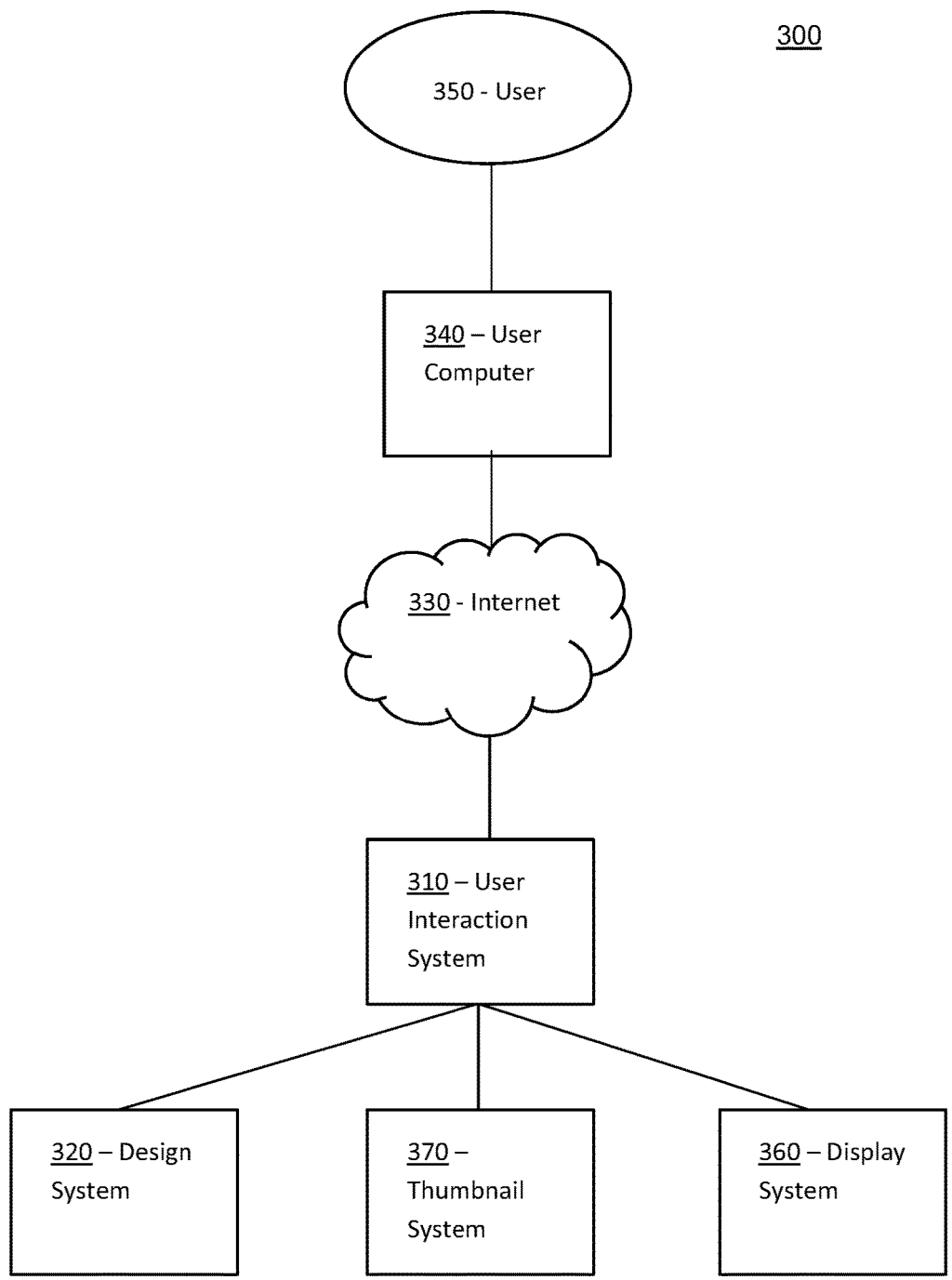
FIG. 3 illustrates a representative block diagram of a system, according to an embodiment.

Skipping ahead now in the drawings, FIG. 3 illustrates a representative block diagram of a system 300, according to an embodiment. System 300 is merely exemplary and embodiments of the system are not limited to the embodiments presented herein. System 300 can be employed in many different embodiments or examples not specifically depicted or described herein. In some embodiments, certain elements or modules of system 300 can perform various methods and/or activities of those methods. In these or other embodiments, the methods and/or the activities of the methods can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In a number of embodiments, system 300 can comprise a user interaction system 310, a design system 320, a thumbnail system 370, and a display system 360. In some embodiments, user interaction system 310, design system 320, thumbnail system 370, and display system 360 can each be or collectively be a computer system 100 (FIG. 1), as described above, and can each be a single computer, a single server, or a cluster or collection of computers or servers.

In many embodiments, system 300 also can comprise a user computer 340. In some embodiments, user computer 340 can be a mobile device. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, user interaction system 310, design system 320, thumbnail system 370, display system 360, and/or user computer 340 can each comprise one or more input devices (e.g., one or more keyboards, one or more keypads, one or more pointing devices such as a computer mouse or computer mice, one or more touchscreen displays, microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of user interaction system 310, design system 320, thumbnail system 370, display system 360, and/or user computer 340 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of user interaction system 310, design system 320, thumbnail system 370, display system 360, and/or user computer 340. In a similar manner, the processing module(s) and the memory storage module(s) can be local and/or remote to each other.

In many embodiments, user interaction system 310 can be configured to communicate with user computer 340. In some embodiments, customer computer 340 also can be referred to as user computer or a customer computer. In some embodiments, user interaction system 310 can communicate or interface (e.g. interact) with one or more user computers (such as user computer 340) through a network or internet 330. Internet 330 can be an intranet that is not open to the public. Accordingly, in many embodiments, user interaction system 310 can refer to a back end of system 300 operated by an operator and/or administrator of system 300, and user computer 340 can refer to a front end of system 300 used by a user 350, respectively. In some embodiments, user 350 can be referred to as a user or a customer. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, user interaction system 310, design system 320, thumbnail system 370, and/or display system 360 also can be configured to communicate with one or more databases. The one or more database can comprise a product database that contains information about products sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s) and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases each can comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between user interaction system 310, design system 320, thumbnail system 370, display system 360, user computer 340 and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.)

Figure 6:
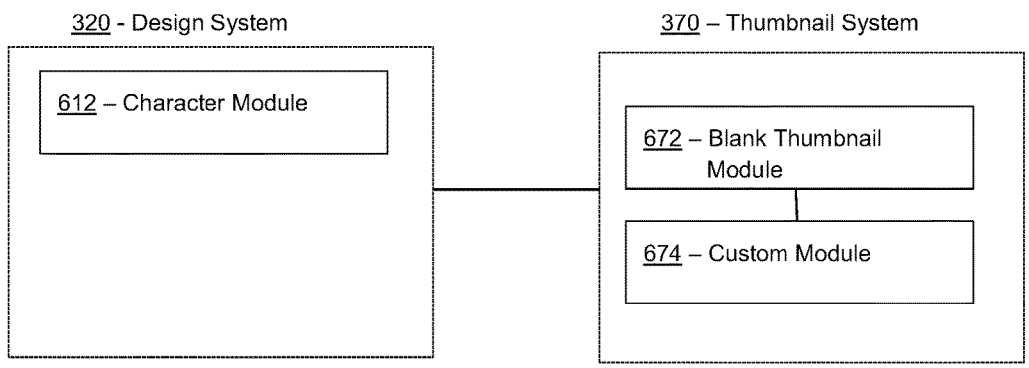
FIG. 6 illustrates a representative block diagram of a portion of the system of FIG. 3, according to an embodiment.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules such as modules 612, 672, and 674 (FIG. 6). Such non-transitory memory storage modules can be part of a computer system such as user interaction system 310 (FIG. 3), design system 320 (FIG. 3), thumbnail system 370 (FIG. 3), and/or display system 360 (FIG. 3). The processing module(s) can be similar or identical to the processing module(s) described above with respect to computer system 100 (FIG. 1).

It is useful for a user to be able to enter custom design criteria or input, such as the user's own monogram, name, word, design, and/or set of one or more characters, and see that input previewed on multiple varied customizable products. Accordingly, there is a need for systems and methods to provide previewing of customizable products that can easily allow a user to compare the user's own input on multiple customizable products. Accordingly, method 400 can comprise an activity 405 of receiving input from a user. In many embodiments, the input can comprise one or more user characters. In many embodiments, each of the one or more user characters can be associated with a different character file of one or more character files. In some embodiments, the one or more user characters can comprise upper case letters, lower case letters, numbers, punctuation, shapes, and/or symbols. In some embodiments, the one or more character files can comprise one or more left character files (e.g. one or more left character files 705 (FIG. 7), one or more center character files (e.g. one or more center character files 710 (FIG. 7), and/or one or more right character files (e.g. one or more right character files 715 (FIG. 7)). In some embodiments, a particular set of left, center, and right character files can be for a single font, but are each a different left, center, or right variation of that font.

In many embodiments, receiving input from the user can comprise receiving a user selection of a font and/or a container type. In some embodiments, the user can select various combinations of a script font, an ark font, a diamond font, a serif font, a circle container, a diamond container, a rectangular container, and/or no container. In other embodiments, the user can select other fonts and shapes. In a number of embodiments, receiving input from the user can comprise receiving a color selection from the user. In some embodiments, the color selection can comprise selecting a character color, a container color, a web design color, and/or a background color.

Method 400 can further comprise an activity 410 of generating a plurality of thumbnails of the one or more user characters on a plurality of customized products by, for each thumbnail of the plurality of thumbnails, composing a monogram file comprising the one or more user characters, and combining a monogram container file of one or more monogram container files with the monogram file. A monogram file also can be referred to as a design file. In many embodiments, a design that is not a monogram can be selected and/or composed (e.g., a name or a word). A monogram container file also can be referred to as a design container file or an emblem file. In some embodiments, generating the plurality of thumbnails of the one or more user characters on a plurality of customized product can comprise, for each thumbnail of the plurality of thumbnails, composing a design file comprising the one or more user characters, and combining a design container file of one or more design container files with the design file.

In many embodiments, combining the monogram container file of the one or more monogram container files with the monogram file can comprise composing a single image file. In many embodiments, combining the monogram container file of the one or more monogram container files with the monogram file can comprise composing a single bitmap file.

In many embodiments, a portion of the one or more monogram container files can comprise a web pattern of one or more web patterns, a web emblem of one or more web emblems, and/or an image of a customizable product of one or more customizable products. In some embodiments, method 400 can further comprise generating the monogram file of the one or more monogram files on a server side of the system (e.g. system 300 (FIG. 3)). In many embodiments, generating the monogram file on the server side of the system can allow for consistent presentation across all clients, while generating the monogram file on the client side of the system can result in inconsistent results in different browsers. In some embodiments, the plurality of thumbnails can be generated in parallel.

Testing of some embodiments showed that the default placement of font characters using standard font rendering techniques produced unattractive monogram layouts due to issues with default character spacing. To address this issue, in some embodiments, method 400 can further comprise adjusting a spacing of the character within each character file of the one or more character files. In some embodiments, this adjusting the spacing of the character within each character of the one or more character files activity can be similar to activities 505 (FIG. 5) and vice versa. In many embodiments, adjusting the spacing of the character within each character file of the one or more character files can comprise defining a number of pixels between adjacent characters in the monogram. In some embodiments, each character can have two or more character files such as, for example, a high resolution character file and a low resolution character file, and the number of pixels between adjacent characters in a monogram can be defined in the high or highest resolution character files at a master library (discussed further below). In some embodiments, adjusting the spacing of the character within each character file of the one or more character files can further comprise, in response to defining the number of pixels between adjacent characters in the monogram, modifying the spacing of the character within each character file of the one or more character files.

In some embodiments, adjusting the spacing of the character within each character file of the one or more character files can comprise using anti-aliasing to remove jagged and/or pixelated edges from rendered images or files. In some embodiments, anti-aliasing can be used in rendering one or more low resolution files (e.g., web files) associated with the one or more character files.

In some embodiments, to control the spacing of each character, font libraries of transparency enabled PNG image files can be created. In some embodiments, the font libraries of transparency enabled image files (e.g. portable network graphics (PNG) files) can contain each character of the alphabet located in a carefully, manually set position inside the file. In a number of embodiments, separate libraries can be created for 1, 2, 3, or more character configurations.

Figure 7:
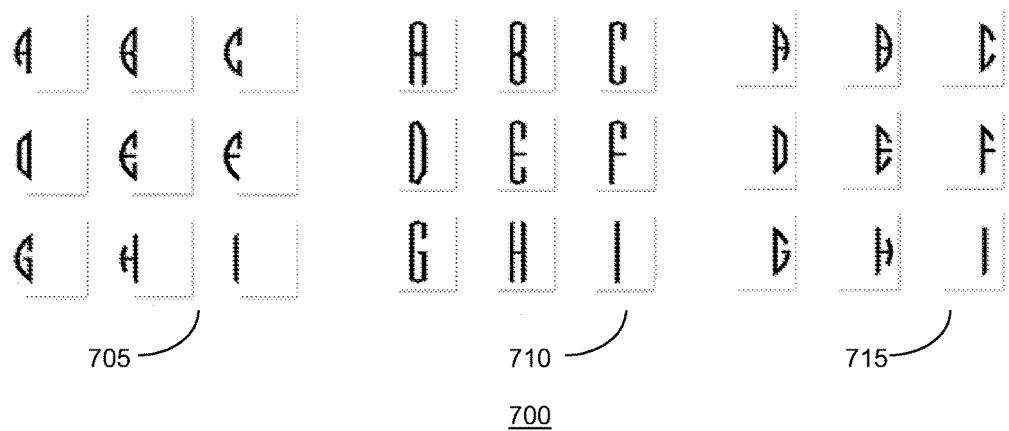
FIG. 7 illustrates a representation of character files, according to an embodiment.
Figure 8:
FIG. 8 illustrates a representation of a 3 character monogram design, according to an embodiment.
Figure 9:
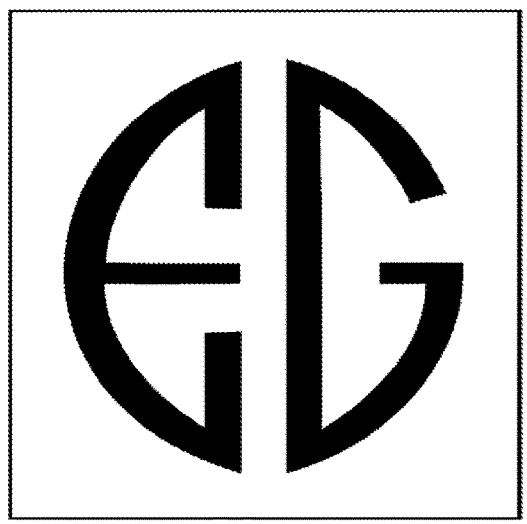
FIG. 9 illustrates a representation of a 2 character monogram design, according to an embodiment.

Turning briefly ahead in the figures, FIG. 7 shows portions of a character set from a library 700. In some embodiments, library 700 comprises one or more left character files 705, one or more center character files 710, and/or one or more right character files 715. In some embodiments, library 700 comprises more than one library, wherein one or more left character files 705 comprise a first library, one or more center character files 710 comprise a second library, and/or one or more right character files 715 comprise a third library. In a number of embodiments, to render a three-character "EHG" monogram 800 (FIG. 8), the "e" file from one or more left characters 705 is composited with the "h" file from one or more center character files 710 and the "g" file from one or more right character files 715. This produces a composed monogram. To render the two-character "EG" monogram 900 (FIG. 9) the "e" file from one or more left characters 705 is composited with and the "g" file from one or more right character files 715.

Figure 10:
FIG. 10 illustrates a representation of a monogram design, according to an embodiment.

In some embodiments, the one or more container files can comprise the same dimensions as the one or more character files. In many embodiments, the position of the emblem or container within the character file and the position of the characters within the one or more character files can ensure a well-aligned final result (e.g., monogram 1000 of FIG. 10 showing characters "EHG" inside a circle monogram container).

In a number of embodiments, pixel count offsets can be defined and stored in a database or text file and applied when rendering previews for users in a web preview. In various embodiments, to improve the speed of generating thumbnails or rendering previews for users in a web preview, the one or more character files can comprise a set of low resolution files and a set of high resolution files associated with the set of low resolution files. In some embodiments, the high resolution files can be referred to as print files, and the low resolution files can be referred to as web files. In many embodiments, one or more low resolution files from the set of low resolution files can be used when generating the plurality of thumbnails for display on a display (e.g., computer monitor or video screen). In some embodiments, the one or more low resolution files from the set of low resolution files are not sent to a printer for printing of a selected product. In many embodiments, one or more high resolution files from the set of high resolution files are sent to the printer for printing of the selected product, and the one or more high resolution files from the set of high resolution files are not used for generating the plurality of thumbnails.

In many embodiments, the high resolution files (e.g., print files) can be the approximate size or exact size needed to print the physical product selected by the user. In many embodiments, the low resolution files (e.g., web files) can be the approximate size or exact size needed for generating a thumbnail of the selected product for display in an online user interface. In many embodiments, a relationship between the sizes of the low resolution file and the associated high resolution file can be stored in a web scale decimal value in a database. In many embodiments, the low resolution file assets are generated by a script from the associated high resolution file assets based at least in part on the web scale.

In some embodiments, a variety of customizable products can require a variety of high resolution files and monogram or design sizes. In some embodiments, to support the various customizable product sizes, a set of libraries can exist for each required size of customizable product (e.g., an iPHONE 6 case or an iPHONE 6 PLUS case). In various embodiments, to generate the sets of character file libraries and monogram container file libraries, the master library can be created, and an asset scale can be defined which can map size relationships of the master library to the individual customizable product libraries. In a number of embodiments, the master library can comprise sets of highest resolution files that are associated with the sets of character file libraries and monogram container file libraries. In many embodiments, the character files and the monogram container files can be generated by a script based on the asset scale to create the print versions of the image files (e.g., the high resolution files). In some embodiments, web versions (e.g., the low resolution files) can be created based on the asset scale multiplied by the web scale.

Figure 11:
FIG. 11 illustrates a representation of a standard design thumbnail.
Figure 14:
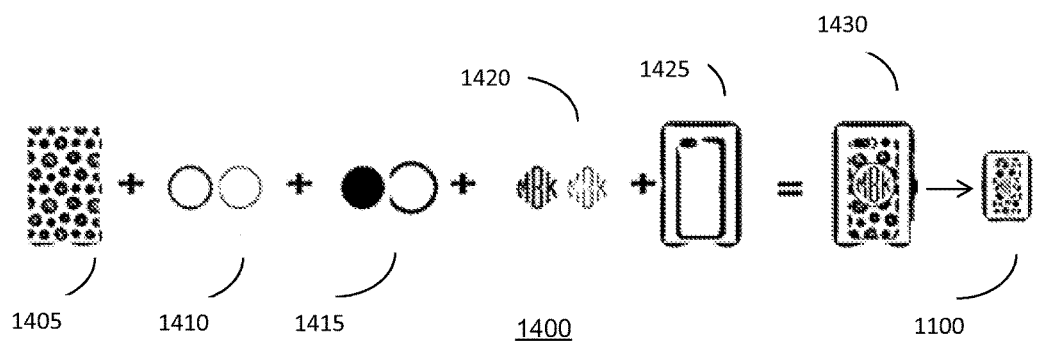
FIG. 14 illustrates a process for generating a standard thumbnail.

Turning ahead in the drawings to FIGS. 11 and 14, FIG. 11 illustrates a standard website thumbnail 1100. In many embodiments, standard website thumbnail 1100 can be generated by a standard generation process 1400 (FIG. 14). The standard generation process 1400 composes an image file 1430 from the following assets: a web pattern 1405, one or more monogram container files 1410 and 1415, one or more character files 1420, and device overlay file 1425. In standard generation process 1400, one or more monogram container files 1410 and 1415 and/or one or more character files 1420 also can be recolored. The image file 1430 can be created at the web scale, and the final image of standard website thumbnail 1100 can be scaled down to a fixed width for presentation on a thumbnails page.

Figure 12:
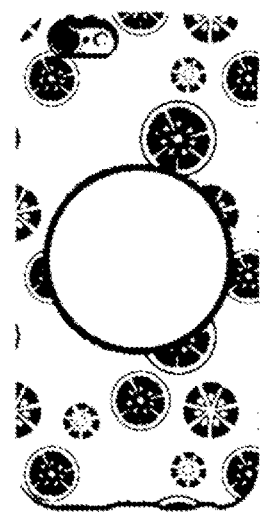
FIG. 12 illustrates a representation of a blank thumbnail, according to an embodiment.
Figure 13:
FIG. 13 illustrates a representation of a custom design thumbnail, according to an embodiment.
Figure 15:
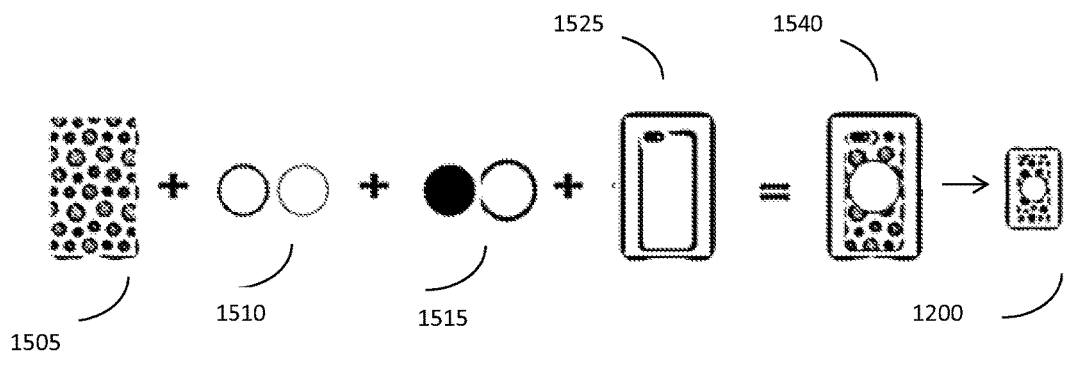
FIG. 15 illustrates a process for generating a blank thumbnail, according to an embodiment.
Figure 16:
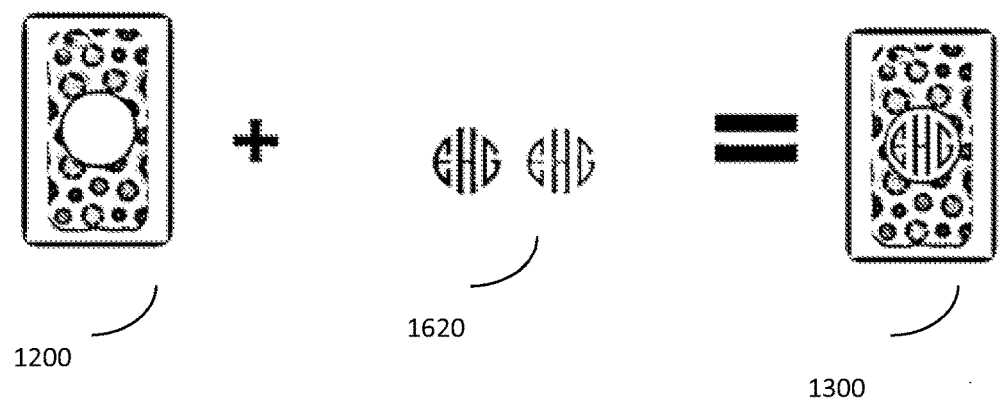
FIG. 16 illustrates a process for generating a custom design thumbnail, according to an embodiment.

FIGS. 12, 13, 15, and 16 illustrate generating the plurality of thumbnails 410 (FIG. 4), according to an embodiment. In some embodiments, generating the plurality of thumbnails 410 (FIG. 4) can comprise generating one or more blank thumbnails by rending one or more blank thumbnails in advance. In some embodiments, the one or more blank thumbnails (e.g., blank thumbnail 1200 (FIG. 12)) can be generated from a third set of character files of the one or more character files. FIG. 12 illustrates blank thumbnail 1200 generated from the third set of character files of the one or more character files. In some embodiments, as shown in FIG. 15, generating blank thumbnail 1200 comprises a processor 1500 comprises composing or assembling a blank thumbnail image file 1540 from a web pattern 1505, one or more monogram container files 1510 and 1515, and device overlay file 1525. In many embodiments, one or more monogram container files 1510 and 1515 also can be recolored. In many embodiments, blank thumbnail 1200 can be generated such that a version of blank thumbnail 1200 can be created and resized from the blank thumbnail 1540 to a fixed width of a desired thumbnail image size. This leaves only the monogram characters to be defined, colored and composited onto the blank thumbnail, as illustrated in FIG. 16. FIG. 16 illustrates generating a thumbnail of the plurality of thumbnails. In some embodiments, blank thumbnail 1200 can be combined with one or more character files 1620 composed in a monogram file to generate a custom thumbnail 1300 (FIGS. 13 and 16). In many embodiments, a plurality of custom thumbnails (e.g., custom thumbnail 1300) can be generated in parallel.

Returning to FIG. 4, method 400 can further comprise an activity 415 of facilitating a display of the plurality of thumbnails to the user. In some embodiments, facilitating a display can comprise displaying the plurality of thumbnails to the user, sending instructions to display the plurality of thumbnails to the user, and/or similar activities.

Turning ahead in the drawings, FIG. 5 illustrates a flow chart for a method 500, according to another embodiment. Method 500 is merely exemplary and is not limited to the embodiments presented herein. Method 500 can be employed in many different embodiments or examples not specifically depicted or described herein. In some embodiments, the activities of method 500 can be performed in the order presented. In other embodiments, the activities of method 500 can be performed in any suitable order. In still other embodiments, one or more of the activities of method 500 can be combined or skipped. In many embodiments, system 300 (FIG. 3) can be suitable to perform method 500 and/or one or more of the activities of method 500. In these or other embodiments, one or more of the activities of method 500 can be implemented as one or more computer instructions configured to run at one or more processing modules and configured to be stored at one or more non-transitory memory storage modules such as modules 612, 672, or 674 (FIG. 6). Such non-transitory memory storage modules can be part of a computer system such as user interaction system 310 (FIG. 3), design system 320, thumbnail system 370, and/or display system 360 (FIG. 3). The processing module(s) can be similar or identical to the processing module(s) described above with respect to computer system 100 (FIG. 1). In some embodiments, method 500 can be similar to method 400.

In many embodiments, method 500 can comprise an activity 505 of modifying one or more character files by, for each character file of the one or more character files and for each monogram container file of one or more monogram container files, adjusting a spacing of a character within each character file of the one or more character files.

Method 500 can further comprise an activity 510 of receiving input from a user, the input comprising one or more user characters, each of the one or more user characters associated with a different character file of the one or more character files. Activity 510 can be similar to activity 405 (FIG. 4), and vice versa.

In a number of embodiments, method 500 can comprise an activity 515 of generating a thumbnail by composing a monogram file comprising the one or more user characters by rendering at least one of the one or more character files, and combining a monogram container file of the one or more monogram container files with the monogram file. In some embodiments, activity 515 can be similar to activity 410 (FIG. 4), and vice versa.

Method 500 can further comprise an activity 520 of facilitating a display of the thumbnail to the user. In some embodiments, activity 525 can be similar to activity 415 (FIG. 4), and vice versa.

FIG. 6 illustrates a block diagram of a portion of system 300 comprising design system 320 and thumbnail system 370, according to the embodiment shown in FIG. 3. Design system 320 and thumbnail system 370 each are merely exemplary and are not limited to the embodiments presented herein. Design system 320 and thumbnail system 370 each can be employed in many different embodiments or examples not specifically depicted or described herein. In some embodiments, certain elements or modules of design system 320 and thumbnail system 370 can perform various procedures, processes, and/or acts. In other embodiments, the procedures, processes, and/or acts can be performed by other suitable elements or modules.

In many embodiments, design system 320 can comprise non-transitory memory storage module 612, and thumbnail system 370 can comprise a non-transitory memory storage modules such as modules 672 and 674. Module 612 can be referred to as a character module 612. Module 672 can be referred to as a blank thumbnail module 672, and module 674 can be referred to as a custom module 674. In many embodiments, character module 612 can store computing instructions configured to run on one or more processing modules and perform one or more acts of methods 400 (FIG. 4), and/or 500 (FIG. 5) (e.g., act 405 (FIG. 4) of receiving input from a user, the input comprising one or more user characters, each of the one or more user characters associated with a different character file of the one or more character files, or similar act 510 (FIG. 5) of receiving input from a user, the input comprising one or more user characters, each of the one or more user characters associated with a different character file of the one or more character files). In some embodiments, blank thumbnail module 672 can store computing instructions configured to run on one or more processing modules and perform one or more acts of methods 400 (FIG. 4) and/or 500 (FIG. 5) (e.g., act 410 (FIG. 4) of generating a plurality of thumbnails of the one or more user characters on a plurality of customized products by, for each thumbnail of the plurality of thumbnails, composing a monogram file comprising the one or more user characters, and combining a monogram container file of one or more monogram container files with the monogram file, or act 515 (FIG. 5) of generating a thumbnail by, composing a monogram file comprising the one or more user characters by rendering at least one of the one or more character files, and combining a monogram container file of the one or more monogram container files with the monogram file). In many embodiments, custom module 674 can store computing instructions configured to run on one or more processing modules and perform one or more acts of methods 400 (FIG. 4), 500 (FIG. 5) and/or 600 (FIG. 6) (e.g., act 410 (FIG. 4) of generating a plurality of thumbnails of the one or more user characters on a plurality of customized products by, for each thumbnail of the plurality of thumbnails, composing a monogram file comprising the one or more user characters, and combining a monogram container file of one or more monogram container files with the monogram file, or act 515 (FIG. 5) of generating a thumbnail by, composing a monogram file comprising the one or more user characters by rendering at least one of the one or more character files, and combining a monogram container file of the one or more monogram container files with the monogram file).

Although systems and methods for previewing customizable products have been described above, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-16 may be modified, and that the foregoing discussion of certain of these embodiments does not necessarily represent a complete description of all possible embodiments. For example, one or more of the activities of FIGS. 3-5 and/or 14-16 may include different activities and/or be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions configured to run on the one or more processors and perform:
      receiving input from a user, the input comprising one or more user characters, each of the one or more user characters associated with a different character file of one or more character files;
      generating a plurality of thumbnails of the one or more user characters on a plurality of customizable products by, for each thumbnail of the plurality of thumbnails:
         composing a monogram file comprising the one or more user characters;
         adjusting a spacing of a character within each character file of the one or more character files by performing anti-aliasing with the one or more processors to remove jagged or pixelated edges when rendering a low-resolution file associated with the each character file of the one or more character files; and
         combining a monogram container file of one or more monogram container files with the monogram file, wherein the one or more monogram container files each comprise a shape, and a monogram of the monogram file is aligned inside the shape of the monogram container file to form a combined image; and
      facilitating a display of the plurality of thumbnails to the user in an online user interface.

2. The system of claim 1, wherein:
   the plurality of thumbnails are generated in parallel.

3. The system of claim 1, wherein:
each of the one or more monogram container files further comprises:
an image of a customizable product of the plurality of customizable products.

4. The system of claim 1, wherein:
adjusting the spacing of the character within the each character file of the one or more character files further comprises:
defining a number of pixels between adjacent characters in the monogram; and
in response to defining the number of pixels between adjacent characters in the monogram, modifying the spacing of the character within the each character file of the one or more character files; and
the computing instructions are further configured to perform:
generating the monogram file of one or more monogram files on a server that is in data communication with the online user interface.

5. The system of claim 1, wherein:
the one or more character files comprise:
one or more left character files;
one or more center character files; and
one or more right character files.

6. The system of claim 1, wherein:
the one or more character files comprise:
a set of low resolution files; and
a set of high resolution files associated with the set of low resolution files.

7. A method being implemented via execution of computing instructions configured to run at one or more processors and stored at one or more non-transitory computer-readable media, the method comprising:
receiving input from a user, the input comprising one or more user characters, each of the one or more user characters associated with a different character file of one or more character files;
generating a plurality of thumbnails of the one or more user characters on a plurality of customizable products by, for each thumbnail of the plurality of thumbnails:
composing a monogram file comprising the one or more user characters;
adjusting a spacing of a character within each character file of the one or more character files by performing anti-aliasing with the one or more processors to remove jagged or pixelated edges when rendering a low-resolution file associated with the each character file of the one or more character files; and
combining a monogram container file of one or more monogram container files with the monogram file, wherein the one or more monogram container files each comprise a shape, and a monogram of the monogram file is aligned inside the shape of the monogram container file to form a combined image; and
facilitating a display of the plurality of thumbnails to the user in an online user interface.

8. The method of claim 7, wherein:
the plurality of thumbnails are generated in parallel.

9. The method of claim 7, wherein:
each of the one or more monogram container files further comprises:
an image of a customizable product of the plurality of customizable products.

10. The method of claim 7, wherein:
adjusting the spacing of the character within the each character file of the one or more character files further comprises:
defining a number of pixels between adjacent characters in the monogram; and
in response to defining the number of pixels between adjacent characters in the monogram, modifying the spacing of the character within the each character file of the one or more character files; and
the method further comprises:
generating the monogram file of one or more monogram files on a server that is in data communication with the online user interface.

11. The method of claim 7, wherein:
the one or more character files comprise:
one or more left character files;
one or more center character files; and
one or more right character files.

12. The method of claim 7, wherein:
the one or more character files comprise:
a set of low resolution files; and
a set of high resolution files associated with the set of low resolution files.

13. A system comprising:
one or more processors; and
one or more non-transitory computer-readable media storing computing instructions configured to run on the one or more processors and perform:
modifying one or more character files by, for each character file of the one or more character files and for each monogram container file of one or more monogram container files:
adjusting a spacing of a character within the each character file of the one or more character files by performing anti-aliasing with the one or more processors to remove jagged or pixelated edges when rendering a low-resolution file associated with the each character file of the one or more character files;
receiving input from a user, the input comprising one or more user characters, each of the one or more user characters associated with a different character file of the one or more character files;
generating a thumbnail by:
composing a monogram file comprising the one or more user characters by rendering at least one of the one or more character files; and
combining a monogram container file of the one or more monogram container files with the monogram file, wherein the one or more monogram container files each comprise a shape, and a monogram of the monogram file is aligned inside the shape of the monogram container file to form a combined image; and
facilitating a display of the thumbnail to the user in an online user interface.

14. The system of claim 13, wherein:
each of the one or more monogram container files further comprises:
an image of a customizable product of one or more customizable products.

15. The system of claim 14, wherein the computing instructions are further configured to perform:
generating the monogram file of one or more monogram files on a server that is in data communication with the online user interface.

16. The system of claim 13, wherein:
the one or more character files comprise:
   one or more left character files;
   one or more center character files; and
   one or more right character files.

17. The system of claim 13, wherein:
adjusting the spacing of the character within the each character file of the one or more character files further comprises:
   defining a number of pixels between adjacent characters in the monogram; and
   in response to defining the number of pixels between adjacent characters in the monogram, modifying the spacing of the character within the each character file of the one or more character files.

18. The system of claim 13, wherein:
the one or more character files comprise:
   a set of low-resolution files, the set of low-resolution files comprising the low-resolution files associated with the each character file of the one or more character files; and
   a set of high-resolution files associated with the set of low-resolution files.

19. A method comprising:
modifying one or more character files by, for each character file of the one or more character files and for each monogram container file of one or more monogram container files:
   adjusting a spacing of a character within the each character file of the one or more character files by performing anti-aliasing with one or more processors to remove jagged or pixelated edges when rendering a low-resolution file associated with the each character file of the one or more character files;
receiving input from a user, the input comprising one or more user characters, each of the one or more user characters associated with a different character file of the one or more character files;
generating a thumbnail by:
   composing a monogram file comprising the one or more user characters by rendering at least one of the one or more character files; and
   combining a monogram container file of the one or more monogram container files with the monogram file, wherein the one or more monogram container files each comprise a shape, and a monogram of the monogram file is aligned inside the shape of the monogram container file to form a combined image; and
facilitating a display of the thumbnail to the user in an online user interface.

20. The method of claim 19, wherein:
each of the one or more monogram container files further comprises:
   an image of a customizable product of one or more customizable products.

21. The method of claim 20, further comprising:
generating the monogram file of one or more monogram files on a server that is in data communication with the online user interface.

22. The method of claim 19, wherein:
the one or more character files comprise:
   one or more left character files;
   one or more center character files; and
   one or more right character files.

23. The method of claim 19, wherein:
adjusting the spacing of the character within the each character file of the one or more character files further comprises:
   defining a number of pixels between adjacent characters in the monogram; and
   in response to defining the number of pixels between adjacent characters in the monogram, modifying the spacing of the character within the each character file of the one or more character files.

24. The method of claim 19, wherein:
the one or more character files comprise:
   a set of low-resolution files, the set of low-resolution files comprising the low-resolution files associated with the each character file of the one or more character files; and
   a set of high-resolution files associated with the set of low-resolution files.

\* \* \* \* \*